United States Patent
Nandy et al.

(10) Patent No.: US 12,445,374 B2
(45) Date of Patent: Oct. 14, 2025

(54) NONSTOP FORWARDING FOR ROUTED MULTICAST TRAFFIC

(71) Applicant: HEWLETT PACKARD ENTERPRISE DEVELOPMENT LP, Spring, TX (US)

(72) Inventors: Tathagata Nandy, Karnataka Bangalore (IN); Chethan Chavadibagilu Radhakrishnabhat, Bangalore (IN); Subramanian Muthumukar, Chennai (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 248 days.

(21) Appl. No.: 18/064,534

(22) Filed: Dec. 12, 2022

(65) Prior Publication Data
US 2024/0195735 A1 Jun. 13, 2024

(51) Int. Cl.
*H04L 45/42* (2022.01)
*H04L 12/18* (2006.01)
*H04L 45/24* (2022.01)

(52) U.S. Cl.
CPC ............ *H04L 45/42* (2013.01); *H04L 12/185* (2013.01); *H04L 45/24* (2013.01)

(58) Field of Classification Search
CPC ....... H04L 45/42; H04L 12/185; H04L 45/24; H04L 45/16; H04L 45/28
See application file for complete search history.

(56) References Cited

U.S. PATENT DOCUMENTS

| | | | |
|---|---|---|---|
| 9,992,100 B2* | 6/2018 | Moopath Velayudhan | ................ H04L 12/185 |
| 2007/0091891 A1* | 4/2007 | Zwiebel | .................. H04L 45/16 370/432 |
| 2009/0135820 A1* | 5/2009 | Suzuki | .................... H04L 45/60 370/390 |
| 2011/0235638 A1* | 9/2011 | Tempia Bonda | ....... H04L 45/16 370/390 |

OTHER PUBLICATIONS

Fenner et al., "Protocol Independent Multicast—Sparse Mode (PIM-SM): Protocol Specification (Revised)", Network Working Group, Request for Comments: 4601, Aug. 2006, 112 pages.

* cited by examiner

*Primary Examiner* — Abdulkader M Alriyashi
(74) *Attorney, Agent, or Firm* — Jones Robb PLLC (57) ABSTRACT

A programmed network device and corresponding method are provided for rebuilding a multicast state upon experiencing a failure in a network using a protocol independent multicast (PIM) protocol. The method includes receiving updates to an outgoing list (Olist) for a given multicast route (mroute) at the network component and updating a PIM cache Olist in the network component with the received updates. During a state of recovering from the failure, the method includes determining whether the PIM cache Olist matches a centralized database Olist located in a centralized database. When a match is found, the method includes publishing an mroute state from the PIM cache to the centralized database.

20 Claims, 5 Drawing Sheets

NONSTOP FORWARDING FOR ROUTED MULTICAST TRAFFIC

INTRODUCTION

Protocol independent multicast (PIM) is a known family of protocols that is used to route multicast traffic within a network. PIM enables the delivery of a stream of information to multiple select destinations within a network without the source device needing to send multiple messages separately addressed to the individual recipients (as would occur with unicast traffic) and also without the messages being sent to every client in the network indiscriminately (as would be the case with broadcast messages). Instead, recipients subscribe to a multicast group associated with a given source of multicast traffic by sending "Join" messages to PIM-enabled networking devices (hereinafter "PIM device"), and then the PIM devices in the network utilize the protocol to determine paths from the source to those clients that have subscribed to the group. Thereafter, when a PIM device receives a multicast stream, the PIM device replicates the multicast packets and forwards them along the determined paths until ultimately the packets are delivered to the multiple clients that have subscribed to the group. There are a number of varieties of PIM, such as PIM-sparse mode (SM), PIM-dense mode (PIM-DM), and various others (all of which are collectively referred to herein as PIM). PIM is often employed for applications where it is desired to send a stream of data, such as a video stream, to multiple clients simultaneously, such as closed circuit television (CCTV) applications where a video stream from a camera may be sent to multiple monitoring stations. Other applications including using PIM to send time-critical precision time protocol (PTP) messages. With most applications in which PIM is utilized, uninterrupted delivery of the multicast data streams is important for the users.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

As noted above, PIM networking devices determine pathing information for forwarding multicast streams to client devices that have subscribed thereto. In particular, a given PIM network device will determine the "next hops" in the network to which the given PIM network device will forward the multicast stream, which may include other PIM networking devices and/or client devices. The pathing information for a given multicast stream may be referred to as a multicast route (mroute), and the PIM devices will store mroutes for the various multicast groups the device has learned. Each mroute may include, among other things, a list of outgoing interfaces (Olist) of the network device (i.e., the outgoing interfaces which are connected to the determined next-hops), and the PIM device may replicate and forward received packets of the multicast stream associated with given mroute to the outgoing interfaces in the Olist of that mroute.

A networking component or device in a network utilizing a PIM protocol may comprise a PIM module that controls multicast functions, and the PIM module may maintain a PIM cache in which the mroutes that have been learned by the network device, including their associated Olists, are stored. The network device uses the PIM cache to program the underlying switching hardware (i.e., to program the outgoing interfaces to which the switching hardware should replicate and forward incoming packets from a given source). In particular, the mroutes in the PIM-cache may be published to a centralized database which controls the programing of the switching hardware, which may also be referred to as a forwarding information base (FIB) or a forwarding table. Publishing an mroute from the PIM cache to the database refers to writing at least the Olist of the mroute to a data structure in the database that corresponds to the mroute.

In operation, the networking device receives PIM messages, such as Join requests and prune requests, from neighbor networking devices or neighboring networking components or connected clients in response to clients subscribing or unsubscribing to multicast groups, and these PIM messages are used by the networking devices to construct the mroutes and their associated Olists for storage in the PIM cache. An mroute exists for each source and group combination learned by the device. As new PIM messages (such as Join requests or prune requests) are received, the network device makes changes to the PIM cache to reflect the addition (Join request) or removal (prune request) of subscriptions to the multicast groups identified in the PIM messages. For example, as Join requests are received for a given multicast group, the PIM cache may be changed to add a new downstream interface to the Olist of an existing mroute corresponding to the given group, or if an existing mroute does not yet exist for the given group then a new mroute (with associated Olist) is added. Subsequently, the contents of the updated PIM cache are copied over to the centralized database to control the underlying switching hardware, thus propagating the addition of the new outgoing interface and/or new mroute down into the switching hardware.

One problem with existing PIM devices is that failures in devices in the PIM stream can cause disruptions to traffic flow for end-users. Failures can be or include PIM module failures, management module failures, virtual switching network (VSF) commander failure, or other failures within the network. A failure occurring within one of the network devices may disrupt all of the multicast flows whose mroute passes through the failed network device. Notably, in many PIM devices the disruption in traffic flow may occur not only during the failure but even after the failed device has recovered. This may occur because existing processes of recovering from the failure may cause the erasure of the pathing information (e.g., the Olists) from the database, and consequently multicast traffic that is received will not be forwarded to the needed outgoing interfaces even though the previously failed device is now fully functional. Eventually, the device will be able to rebuild its Olists and normal traffic flow may resume, but this may take some time and until the Olists are rebuilt disruptions to the traffic flows will be experienced. As noted above, such disruptions may not be acceptable in certain multicast applications. Accordingly, examples provided herein provide a solution for eliminating traffic disruption to end users that would otherwise result from the process of recovering from PIM device failures. The reasons for the erasure of the pathing information as a result of existing the recovery processes, as well as some aspects of the solutions disclosed herein that eliminate this problem, will be described in greater detail below.

For many types of failure at a PIM device, the PIM module of the failed device will lose its PIM cache (which is stored in volatile memory). Therefore, to help the failed network device rebuild its PIM cache during a recovery procedure, each neighboring router that becomes aware that the recovering device has failed and is now recovering takes steps to ensure the recovering network device can relearn the mroutes. In particular, the neighboring networking devices resend PIM Join requests to the recovering network device. From these re-sent Join requests, the mroutes and associated Olists in the PIM cache of the recovering device can be reconstructed, one Join at a time.

However, there is a problem with the above-described recovery process. In the recovery mode, the network hardware is already programmed with the mroutes that had been learned prior to the failure, as the centralized database that controls the programming of the network hardware is stored in non-volatile memory and thus is not lost during the failure. But because the PIM cache is lost during the failure and hence is empty at the start of the recovery, there will be a mismatch between the PIM cache (which is empty) and the centralized database (which is populated with Olists of mroutes). As a result, when the PIM module receives a Join message from its neighbor as part of the recovery process and adds the corresponding Olist and mroute to its PIM cache, the resulting updated PIM cache may be incomplete because it will omit outgoing interfaces for which Join messages have not yet been received. For example, if the Olist of a given mroute previously contained the outgoing interfaces $\{O_1, O_2, O_3\}$ before a failure, and then during recovery a first Join message is received for that same mroute specifying outgoing interface $O_1$, the updated Olist for that mroute would contain just $\{O_1\}$, i.e., the outgoing interfaces $O_2$ and $O_3$ are missing from the updated Olist. As a result, if the centralized database is then overwritten with the updated PIM cache, as is done conventionally whenever the PIM cache receives an update, the corresponding Olist/mroute that was previously stored in the centralized database will be overwritten with an incomplete Olist, and therefore at least some outgoing interfaces (and potentially entire Olists/mroutes) that were previously stored in the database may be lost from the centralized database. For example, returning to the scenario described above in which the updated Olist in the PIM cache comprises $\{O_1\}$, after publishing this updated Olist to the database the two outgoing interfaces $O_2$ and $O_3$ which were previously stored in the database will now be missing from the database, and thus any traffic that should have flowed to $O_2$ and $O_3$ will be disrupted. While these lost Olists/mroutes will eventually be added back into the centralized database as the new Join messages are eventually received and processed, in the meantime before they can be added back into the centralized database, any traffic that is received along one of those missing Olists/mroutes will be lost. Thus, during the recovery process, traffic flows through the recovering device can be disrupted, thus causing a traffic disruption for some end users.

To avoid such loss of Olists/mroutes from the centralized database during recovery, and the resultant disruption to traffic this may cause, examples provided herein include a controlled method for updating mroutes to avoid traffic loss resulting from a recovery process. Examples described herein modify the PIM module programming to prevent the PIM module from overwriting the centralized database (and hence the underlying hardware) with the Olists from the PIM cache during the recovery process until the Olists from the PIM cache have been rebuilt to the point that they match those in the centralized database. That is, as a Join request is received from neighbors, the PIM module will add a corresponding outgoing interface to the Olist of a corresponding mroute in its PIM cache. However, instead of immediately publishing that Olists from the PIM cache to the centralized database as would occur during normal processing, the PIM module will first check whether the Olist in the PIM cache matches the corresponding Olist in the centralized database. If the PIM cache Olist does not match the corresponding Olist in the centralized database, the PIM module will refrain from publishing the Olist from the PIM cache to the centralized database. Eventually, once the Olist in the PIM cache matches the Olist in the centralized database, normal processing can be resumed for that mroute and subsequent updates to the Olist of that mroute that occur in the PIM cache can be published directly to the centralized database. Thus, the hardware programming should remain intact during the recovery process to avoid traffic loss.

In some examples, the comparing of the Olists of the PIM cache to the Olists of the database may comprise computing hashes of the Olists and comparing the hashes. In some examples, the solution computes a hash for the Olist for every mroute in both the PIM cache and the centralized database. The solution then compares the hashes to determine if the mroutes in the centralized database are the same as the mroutes in the PIM cache.

In some examples, the above-described comparing of Olists and the determination of whether to publish or refrain from publishing the mroutes may be performed on an mroute by mroute basis. That is, when a change is made to a given mroute, the Olist of just that given mroute is compared to the corresponding Olist in the database and the PIM module may determine whether to publish or refrain from publishing that given mroute to the database based on the comparisons. When a given mroute has been rebuilt to the point that its Olists now match the corresponding Olists in the database, then publishing may resume for that given mroute (but not necessarily for other mroutes). In other examples, the comparing of Olists and the determination to publish or not publish may be made for the entire PIM cache and database all as one. That is, in these examples the comparison comprises comparing all of the Olists in the PIM cache with all of the Olists in the database (or hashing them and comparing the hashes), and the PIM module refrains from publishing any of the mroutes to the database until all of the Olists in PIM cache match those in the database. In both of these cases, however, updates to mroutes that have not yet been fully rebuilt are not published, and thus the problem of overwriting the database with an incomplete Olist, and thus potentially disrupting traffic flows, is avoided.

In some examples, the recovery process also considers Joins that are received during the recovery which are truly new, meaning Joins that are received in response to a new subscription and which were not previously received by the PIM device prior to the failure (as distinguished from the Joins which neighbors are resending to the device merely to facilitate recovery). In some example recovery processes disclosed herein, when such a new Join message is received, the corresponding outgoing interface is written to the database even if the corresponding PIM-cache mroute is not yet fully rebuilt. In other words, when a new outgoing interface is added to an Olist an mroute in the PIM cache, if that outgoing interface does not match any found in the corresponding Olist mroute in the database, then it may be considered as a new outgoing interface and may be added to the Olist in the database, regardless of whether the PIM-cache and database Olists match. However, publishing of the full Olist will continue to be delayed until it matches the database, as described above, to prevent potentially overwriting the database Olist with an incomplete list. Thus, these examples ensure that Joins from new interfaces are immediately added without delay without publishing an entire incomplete mroute state to the centralized database.

The description provided herein references a "state" such as an "mroute state". "A state", as used herein, includes a condition of the networking device, conditions of components of the networking device (e.g., different software processes executable by a processing resource, hardware components, etc.), and/or conditions in the environment that may impact the networking device. An "mroute state" within the PIM cache therefore may reflect a current status of the mroutes as computed based on the stored Olists in various phases of the recovery process. Thus, the mroute state changes throughout the recovery process. Publishing the mroute state from the PIM cache to the centralized database entails overwriting the Olist of the corresponding mroute as stored in the centralized database with the current version of the Olist from the PIM cache.

Turning now to the figures, various devices, systems, and methods in accordance with aspects of the present disclosure will be described.

Figure 1:
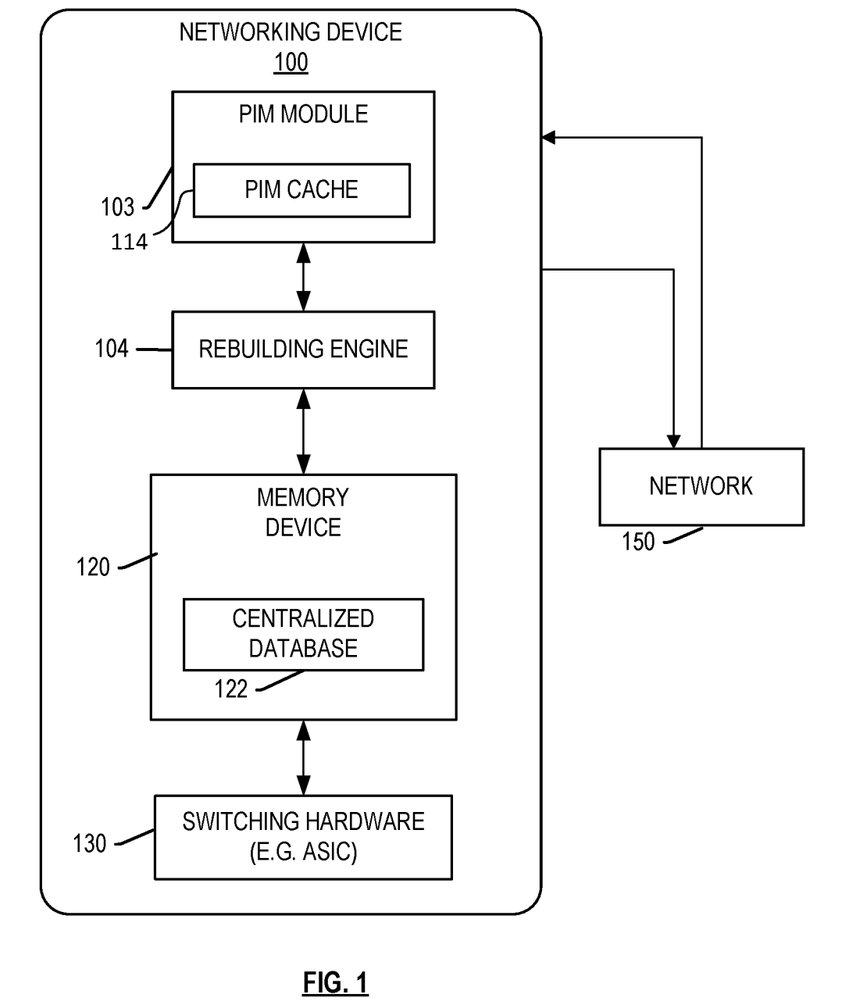
FIG. 1 is a block diagram illustrating a networking device in accordance with examples set forth herein.

FIG. 1 is a block diagram illustrating a network device or networking device 100 in accordance with examples set forth herein. Non-limiting examples of a networking device include a router, switch, etc. Networking device 100 may be connected to other computing devices in the network. As used herein, a "computing device" may include a server, a networking device, a chipset, a desktop computer, a workstation, a mobile phone, a tablet, an electronic reader, or any other processing device or equipment.

Networking device 100 comprises a PIM module 103 and a rebuilding engine 104. Other engines or modules may be added to networking device 100 to provide additional or alternative functionality. The PIM module 103 and the rebuilding engine 104 may interact with one another and may further interface with a memory device 120 that is instrumental in programming switching hardware 130. The networking device 100 may be connected to a network 150. The network 150 may comprise other computing devices, including networking devices similar to networking device 100.

Memory device 120 may incorporate a centralized database 122 storing network information, such as Olists for multiple mroutes and mroute states. The memory device 120 may be a non-volatile memory device (e.g., flash memory, battery-backed RAM, etc.) in some examples to allow the central database 122 to persist even when the device 100 is powered off. The database 122 is referred to as "centralized" because it is accessible to all components of the networking device 100. The centralized database 122 may, for example, be an Open vSwitch Database (OVSDB). The centralized database 122 may store information related to different components in the networking device 100, including information associated with multicast flow including mroutes and Olists. The different information may be stored in different tables in the centralized database. This information is also accessible for programming of the switching hardware 130. Other non-limiting examples of information stored may include information regarding addresses for multicast groups (e.g., in an Mroute table), next hop information, etc. In some examples, the centralized database 122 may be, or comprise, a Forwarding Information Base (FIB) or Forwarding Table.

The switching hardware 130 comprises the underlying physical communication pathway that communicate the data, such as the physical interfaces (e.g., ports) and the internal switching fabric that selectively connects these ports together (e.g., a crossbar array or other physical data communication lines). The switching hardware 130 may also comprise control circuitry that controls and enables the aforementioned underlying physical communication pathways. This control circuitry may be or include, for example, an application-specific integrated circuit (ASIC), a field programmable gate array (FPGA), a complex programmable logic device (CPLD), a programmable array logic (PAL), or other type of switching hardware. The networking device 100 may be configured to program the switching hardware 130 based on the centralized database 122. In other words, the data stored in the centralized database 122—particularly the Olists of the mroutes stored therein—control how the switching hardware 130 operates to forward data, for example controlling which outgoing interfaces will have certain data forwarded to them.

Each of engines or modules 103, 104, and any other engines or modules, may be any combination of hardware (e.g., a processor such as an integrated circuit or other circuitry) and software (e.g., machine or processor-executable instructions, commands, or code such as firmware, programming, or object code) to implement the functionalities of the respective engine. This hardware and/or software that constitute (or instantiates) the modules 103 and 104 may be referred to herein collectively as processing circuitry. Although the rebuilding engine 104 and the PIM module 103 are shown separately in FIG. 1, this division is merely one of convenience to facilitate description and in some examples the rebuilding engine 104 and the PIM module 103 may be part of, or instantiated by, the same underlying hardware and/or software entities. In particular, in some examples, the PIM module 103 may comprise the rebuilding engine 104. Further, as used herein, the singular forms "a," "an," and "the" include plural referents unless the context clearly dictates otherwise, Thus, for example, the term "engine" is intended to mean at least one engine or a combination of engines. Each engine of the networking device 100 can include at least one machine-readable storage mediums (for example, more than one) and at least one computer processor (for example, more than one). For example, software that provides the functionality of engines on networking device can be stored on a memory of the networking device 100 to be executed by a processor of the networking device 100.

The PIM module 103 may include a combination of hardware and software. The PIM module 103 may implement a multicast flow protocol, such as protocol in the PIM family of protocols (e.g., PIM-SM, PIM-source specific mode (SSM), etc.). Accordingly, the PIM module 103 may allow networking device 100 to process and route multicast flow packets received by networking device 100. During its processing of multicast flow packets, the PIM module 103 may understand the multicast environment of networking device 100 (e.g., neighbor devices), determine routing paths that should be programmed into the switching hardware 130 of networking device 100, and perform other functions associated with processing multicast traffic. The PIM module 103 may keep records of the determined multicast routes, as well as of the states of other components of the networking device 100. Accordingly, the PIM module 103 may comprise a memory storing this information, such as a PIM cache 114, as will be further explained with reference to FIG. 3. In addition, the PIM module 103 will publish information stored in the PIM cache 114 (such as Olists) to the central database 122, and as a result this information being added to the database 122 the state of the switching hardware 130 may be changed. Thus, the PIM module 103 is able to control aspects of the programing of the switching hardware 130 by writing to the PIM cache 114 and then publishing information from the PIM-cache 114 to the central database 122.

As disclosed herein, the PIM module 103 may process multicast flow packets received by networking device 100. While doing this, networking device 100 may encounter an error, requiring it to restart its processes. The failure may be or include, for example, PIM module failures, management module failures, virtual switching network (VSF) commander failure, in-service software upgrade (ISSU) failure, or other failures within the network 250. After restarting, the PIM module 103 may lose all the information that it previously had on the state of the different components involved in the multicast protocol. However, the PIM module 103 is able to rebuild its knowledge as will be further described herein. The network devices are generally configured to include a generation identifier (genID) in various messages sent between the network devices, and the PIM module 103 has the capability to change the genID when the networking device 100 experiences a failure. This signals to the other network devices that the sending network device experienced a failure. When the PIM module 103 changes its genID, neighboring networking devices, which are similar in structure to the displayed networking device 100, become aware of the failure based on detecting the change in the genID. In response to this, the neighboring devices send Join requests to the networking device 100 to help it rebuilt its PIM cache. The PIM module 103 may interact with the rebuilding engine 104 to receive and process the Join requests.

The rebuilding engine 104 may also include a combination or hardware and software and may operate to rebuild Olists for mroutes within the PIM module 103, prompting the PIM module 103 to store the rebuilt Olists in its PIM cache. The rebuilding engine may be configured to prevent publishing of mroute states during a recovery of the device 100 until the mroutes in the PIM cache have been rebuilt. The rebuilding engine 104 may further interact with the centralized database 122 of the memory device 120 in order to compare Olists stored in the centralized database 122 with Olists stored in the PIM cache 114 of the PIM module 103. In particular, in some examples, when the Olist of a given mroute stored in the PIM cache 114 is not the same as the Olist of a corresponding mroute in the database 122, the rebuilding engine 104 may prevent the publication of the mroute state of the given mroute from the PIM cache 114 to the centralized database 122. On the other hand, when the Olist of a given mroute stored in the PIM cache 114 is the same as the Olist of a corresponding mroute in the database 122, the rebuilding engine 104 may allow publishing of the mroute state of the given mroute from the PIM cache 114 to the centralized database 122 to resume. In other words, in these examples the comparison of Olists and determination of whether to prevent or allow publishing is made on an mroute-by-mroute basis. In other examples, the rebuilding engine 104 may prevent the publication of the mroute states of all of the mroutes in the PIM cache 114 if any of the Olists stored in the PIM cache 114 do not match the corresponding Olist in the database 122. On the other hand, when all of the Olists stored in the centralized database 122 are the same as the Olists stored in the PIM cache 114, the rebuilding engine 104 may permit publishing of the mroute states of all the mroutes in the PIM cache 114 to the centralized database 122. In other words, in these examples the comparison of Olists and determination of whether to prevent or allow publishing is made on the basis of the entire PIM cache 114. By preventing the publication of mroutes (whether individual mroutes or the entire PIM cache 114) until they match those in the central database 112, the rebuilding engine 104 prevents potentially incomplete Olists from overwriting data in the database 122 and thus the consequent loss of traffic.

Further, the rebuilding engine 104 may ensure that when the Olists do not match while a recovery status or state exists, new outgoing interfaces (e.g., which are not found in the database 122, and which may result from new Joins) are written to the centralized database 122 without publication of the mroute state to the centralized database 122. The rebuilding engine 104 has knowledge of the types of information stored in the centralized database 122 and in the PIM module 103 and is able to access the appropriate memory locations during execution of the algorithm.

Once the mroutes in the PIM cache 114 match those in the database 122, the rebuilding engine 104 may cease a recovery phase and allow the PIM module 103 to return to normal processing of PIM messages. Such normal processing may include immediately publishing updated Olists without first comparing any Olists in the PIM cache 114 to Olists in the database 112. The rebuilding engine 104 may, for example, set a flag that indicates whether a recovery phase is ongoing or not, and the state of this flag may be considered to determine whether the aforementioned recovery processes need to be performed. In some examples, the flag may be set on an mroute-by-mroute basis, so that some mroutes may return to normal processing before others. In other examples, the flag may be set for the entire PIM cache 114, such that normal processing is not resumed until the all the Olists in the PIM cache 114 match those in the database 112.

Figure 2:
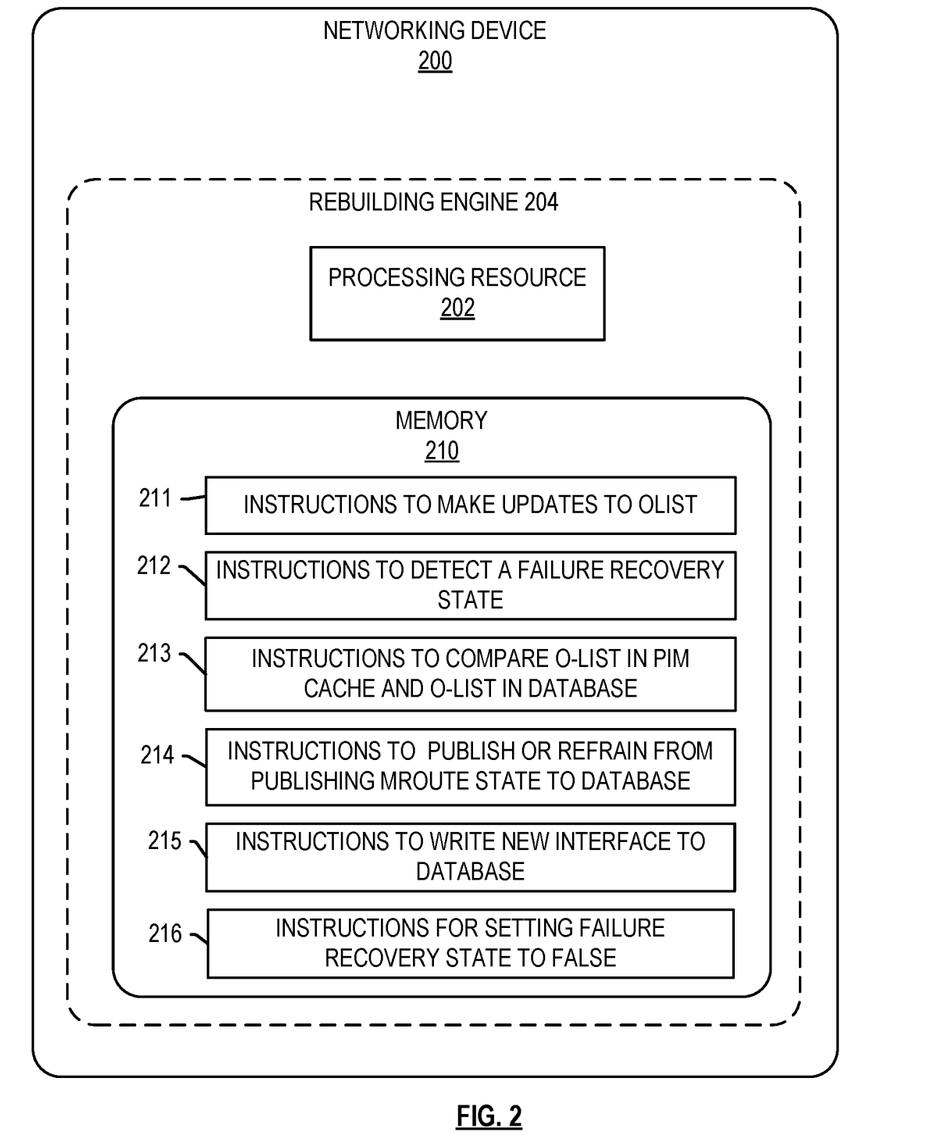
FIG. 2 is a block diagram illustrating a networking device storing instructions in accordance with examples set forth herein.

FIG. 2 is a block diagram illustrating a networking device 200 in accordance with examples set forth herein. The networking device 200 may be one example configuration of the networking device 100 described above. The networking device 200 includes a rebuilding engine 204, which may be one example configuration of the rebuilding engine 104 described above with reference to FIG. 1. Some aspects of the rebuilding engine 204 may be similar to aspects of the rebuilding engine 104 already described above and duplicative description thereof is omitted. The networking device 200 may include additional components which are omitted from FIG. 2, such as a PIM module, a memory device storing a central database, and switching hardware, like those described above in relation to the networking device 100.

In the example network device 200, the rebuilding engine 204 includes both a processing resource 202 and a memory 210.

The memory 210 may be a machine readable storage medium or a non-transitory computer-readable medium and may store instructions 211, 212, 213, 214, 215, and 216. As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

The rebuilding engine 204 may comprise, or may be instantiated on or by, a processing resource 202 executing machine readable instructions to perform operations described herein. The processing resource 202 may execute the aforementioned instructions to perform the functions described herein. Further, in some examples, the memory 210 may include additional instructions.

The processing resource 202 may, for example, be in the form of a central processing unit (CPU), a semiconductor-based microprocessor, a digital signal processor (DSP) such as a digital image processing unit, or other hardware devices or processing elements suitable to retrieve and execute instructions stored in a storage medium such as the memory 210. The processing resource 202 may, for example, include single or multiple cores on a chip, multiple core across multiple chips or devices, or suitable combinations thereof. The processing resource 202 is configured to fetch, decode, and execute instructions stored in the memory 210 as described herein.

Instructions 211 may be executable by the processing resource 202 to make updates to an Olist stored in a PIM cache of a PIM module described herein. For example, upon receipt of a Join request from a neighboring networking device, the instructions 211 may provide for updating an Olist in the PIM cache 114 of the PIM module 103 described above with respect to FIG. 1. The update to the Olist may include, for example, the addition of an outgoing interface to the Olist of a given mroute, with the outgoing interface and the mroute being determined from the information included in the received Join request in accordance with the multitasking protocol being used by the device 200.

Instructions 212 to detect a failure recovery state or status may be executed by the processing resource 202 to determine whether the networking device 200 has experienced a failure and is still in a state of recovery from that failure. In examples set forth herein, upon resuming operation (e.g., being restarted) after a failure of the networking device 200, the network device 200 may change its genID, for example, by incrementing it by one as set forth above. Once this change to the genID occurs, the networking device 200 stores information indicating that the device 200 is in a failure recovery state or status. For example, one or more flags may be set to indicate a failure recovery state. Accordingly, the instructions 212 are configured to determine whether this failure recovery state remains true. If the failure recovery state is false, the instructions 212 direct the PIM module 103 described above to revert to normal processing of PIM messages. However, if the failure recovery state is true, the rebuilding engine 204 executes an algorithm to rebuild the knowledge in the PIM cache in a manner directed to avoiding traffic loss as further discussed below. The rebuilding algorithm comprises the instructions 213-216.

In some examples, the determination of whether to proceed with normal processing or to utilize the rebuilding algorithm may be made for the entire PIM cache as a whole based on a single flag indicating the failure recovery state. In other examples, a failure recovery state flag may be maintained for each individual mroute in the PIM cache and the determination of whether to proceed with normal processing or to utilize the rebuilding algorithm may be made on a mroute-by-mroute basis. In other words, some mroutes may have their flags set to false (indicating the failure recovery state is no longer applicable for those mroutes and PIM messages directed to those mroutes should be processed normally) while other mroutes may still have their flags set to true (indicating that the rebuilding algorithm described below should be applied to PIM messages directed to those mroutes). Initially after a failure, the failure recover flag (or all of the failure recovery flags in cases where there are multiple) are set to true. When the failure recovery state flag(s) is(are) reset to false is controlled by the rebuilding algorithm described below.

Instructions 213 are cause the processing resource 202 to compare an Olist stored in the PIM cache of the PIM module with an Olist in the centralized database. As discussed above, in some examples, the instructions 213 include instructions to compute a hash of the Olist in the PIM module 103 and also compute a hash of the Olist in the centralized database 122 in order to make the comparison. Other methods for comparing the contents of the PIM module cache and the centralized database are within scope of the disclosure. As noted above, in some examples the Olist of a single mroute in the PIM cache (e.g. an mroute whose Olist has been updated in view of a received Join message) is compared to a corresponding Olist from the database, whereas in other examples all of the Olists in the PIM cache are compared to the Olists in the database.

Instructions 214, when executed by the processing resource 202, dictate when an mroute state should be published to the centralized database 122 and when the mroute state should not be published to the centralized database 122. More specifically, when the compared Olists of the PIM module 103 and the centralized database 122 are equal (as determined per execution of instructions 213), the PIM module 103 publishes the mroute state of one or more mroutes to the centralized database 122. However, when the compared contents are not equal, the PIM module 103 refrains from publishing the mroute state of one or more mroutes to the centralized database 122. More specifically, in some examples, an individual mroute that has been updated in the PIM cache will be published to the database if the Olist thereof matches the Olist of the corresponding mroute in the database, and not otherwise. This may allow for some mroutes that are ready for publication to be published even if some others are not yet ready for publication. In other examples, no mroutes will be published to the database until all of the Olists in the PIM cache match the Olists in the database.

Instructions 215, when executed by the processing resource 202, provide for writing a new interface to the centralized database 122 when a new interface is present in the PIM module 103, but the contents in the PIM module 103 and the centralized database 122 are not equal and the failure recovery flag is still false. A new interface means an outgoing interface that is specified in an Olist in the PIM cache but which is not found in the Olist of the corresponding mroute of the database 122. Such a new interface may appear because a new Join request was received (i.e., a Join request not previously received, in contrast to Join requests being resent from neighboring devices). In this case, the full mroute state is not published to the database 122 because the Olist in the PIM cache is not yet the same as the Olist in the database. However, to ensure that the new interface can begin receiving data flows immediately without having to wait for the fully mroute to be rebuilt, the individual interface may be added to the corresponding Olist in the database without updating the rest of the Olist. Thus, rather than publishing an entire mroute state to the centralized database 122, the PIM module 103 merely updates the centralized database 122 with the new interface when a new interface is present in the PIM module 103.

Additionally, the memory 210 stores instructions 216 for setting a failure recovery state to false. More specifically, when the compared contents of the PIM module 103 and the centralized database 122 are the same, the instructions 216 may be executed to set the failure recovery state to false. For example, in cases where a single flag is used for the entire PIM cache, then when all of the Olists in the PIM cache are determined to match the Olists in the database (per instructions 213) the flag may be set to false. As another example, in cases where each mroute has its own flag associated therewith, the flags may be set to the false state on an mroute-by-mroute bases when the Olist of the respective mroute is determined to match the Olist of the corresponding mroute in the database (per instructions 213). Effectively, the instructions 216 move either an individual mroute or the entire networking device 200 out of the failure recovery state when the mroute state of the individual mroute or of all of the mroutes in the PIM module 103, as the case may be, is or are published to the centralized database 122.

Note that the failure recovery state described herein relates specifically to the process of rebuilding the PIM cache, but other failure recovery states may be present in the device which are not necessarily tied to the aforementioned failure recovery state. Thus, references herein to determining that the failure recovery state is true or false should not be misunderstood as meaning that all possible failure recovery states are true or false. That is, the failure recovery states of instructions 212 and 216 may be set to true or false independently of other failure recovery states in some examples.

Networking device 200 of FIG. 2, which is described in terms of engines containing hardware and software, can include one or more structural or functional aspects of networking device 100 of FIG. 1, or of networking device 300 of FIG. 3 described below.

Figure 3:
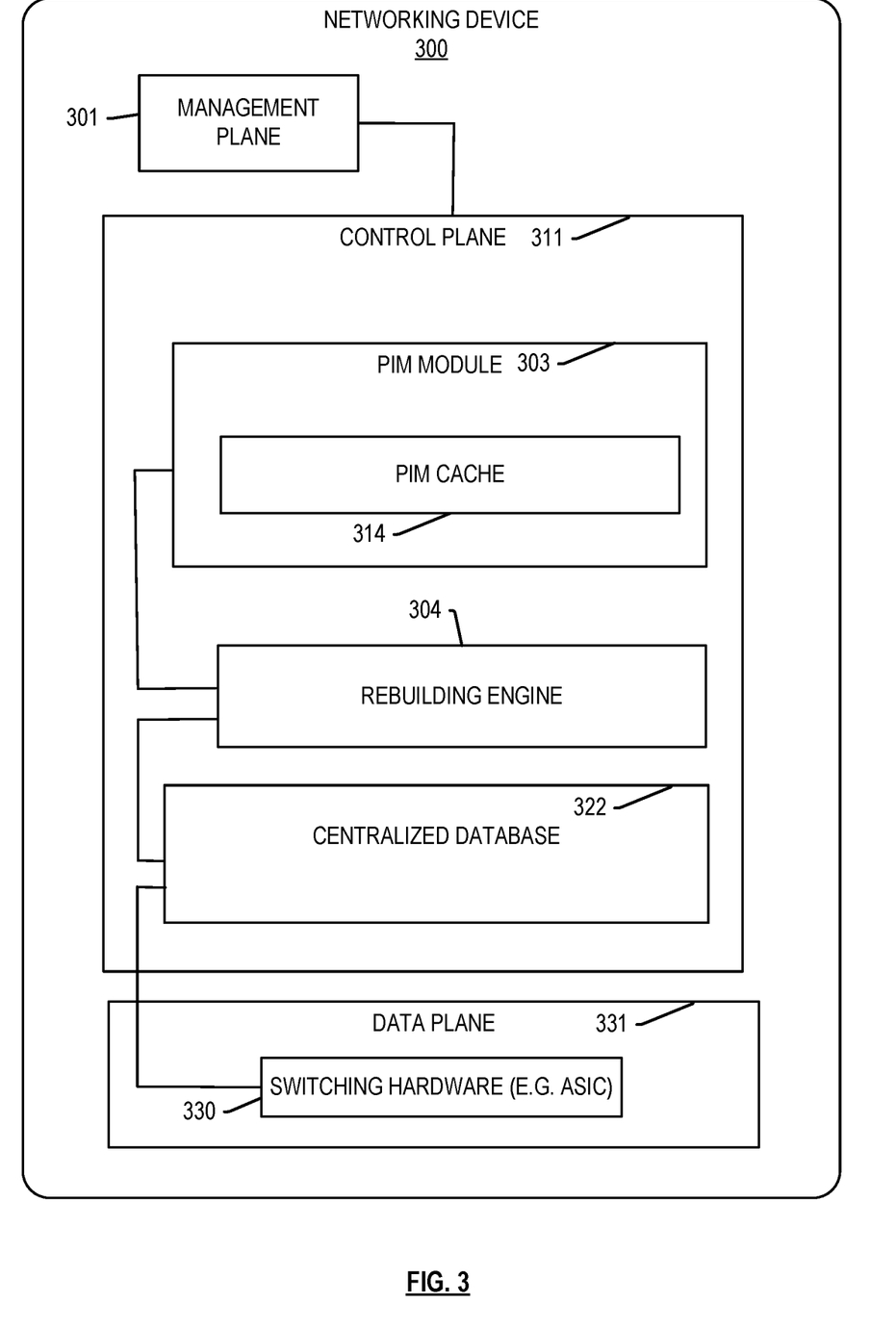
FIG. 3 is a block diagram illustrating further details of a networking in accordance with examples described herein.

FIG. 3 is a block diagram illustrating further details of a networking device 300 in accordance with examples described herein. The networking device 300 may, for example, be a switch or router. The networking device may be one example configuration of the networking device 100 and/or the networking device 200 described above. The networking device 300 may include a management plane 301, a control plane 311, and a data plane 331. The networking device 300 may be connected to a network, such as for example, the network 150 of FIG. 1. The management plane 301 may be used to manage networking device 300, for example by setting configurations through a user interface.

The control plane 311 includes components associated with packet flows through the networking device 300. The control plane 311 may for example, include a PIM module 303 including a PIM cache 314. The PIM cache 314 may be stored in a volatile memory structure and thus the contents of the PIM cache 314 may be erased after a failure occurs.

In some embodiments, two PIM modules 303, including an active and a standby PIM module may be incorporated in the networking device 300. Having duplicate components enables the standby component to take over in the event of a failure impacting the active PIM module. Generally, when multiple PIM modules 303 are present, they will synchronize their PIM caches 314 through known synchronization schemes such that the PIM caches 314 are identical until or unless one module 303 fails. Thus, in examples provided herein, when comparing the PIM cache 314 to the centralized database 322 the method may select one of the PIM caches 314 for the comparison (i.e., the PIM cache 314 of whichever PIM module 303 is currently acting as active module). Accordingly, for purposes of the processes described herein, if multiple PIM modules 303 are present they may effectively be treated as if they were a single PIM module 303.

A rebuilding engine 304 may also be included on the control plane 311. The rebuilding engine 304 is one example for the rebuilding engine 104 and/or 204 described above. The rebuilding engine 304 may comprise, or may be instantiated on or by, a processing resource executing machine readable instructions to perform operations described herein, dedicated hardware devices (e.g., an ASIC, FPGA, CPLD, etc.) or some combination of these.

Further, the centralized database 322 may also be included on the control plane 311 and may be stored in a different memory than the PIM cache 314. That is, the centralized database 322 may be stored in a centralized, non-volatile memory.

In operation, the networking device 300 may receive PIM messages, such as a Join request, from a neighbor networking device or connected client device. The requests may be handled by the PIM module 303. The PIM module 303 may store information from the Join requests in the PIM cache 314, in particular adding outgoing interfaces to Olists of mroutes associated with the requests. The PIM module 303 also publishes the updated mroutes to the centralized database 322, subject to the control of the rebuilding engine 304, so that the new mroute state information can be propagated down into the data plate 331. The rebuilding engine 304 may control the updating of the database 322 by the PIM module 303 such that an mroute status is prevented from being published when recovery is underway and the Olist of the mroute (or of all mroutes) does not match the corresponding Olist (or all of the Olists) in the database 322, as described above.

The data plane 331 may also include switching hardware 330. The switching hardware 330 is one example of the switching hardware 130 described above. The switching hardware 330 is programed based on the information stored in the database 322, particularly the mroute states (including Olists) stored therein. Because the database 322 is stored in non-volatile media, the switching hardware 330 remains programmed with mroute states throughout the occurrence of failure and the rebuilding process.

The networking devices 200 and 300 may be examples of, or illustrate aspects of, the networking device 100. Some components of the networking devices 100, 200, and 300 may be similar to one another. Such similar components may be referred to herein using the same last two digits (for example, centralized databases 122, 222, and 322). These similar components may be configured similarly, except when noted otherwise or where logically contradictory, and thus descriptions herein of such component may be applicable to the other similar components. Accordingly, duplicative descriptions of such components are omitted herein. The networking device 300 can include one or more structural or functional aspects of networking device 100 of FIG. 1 or network device 200 of FIG. 2.

Figure 4:
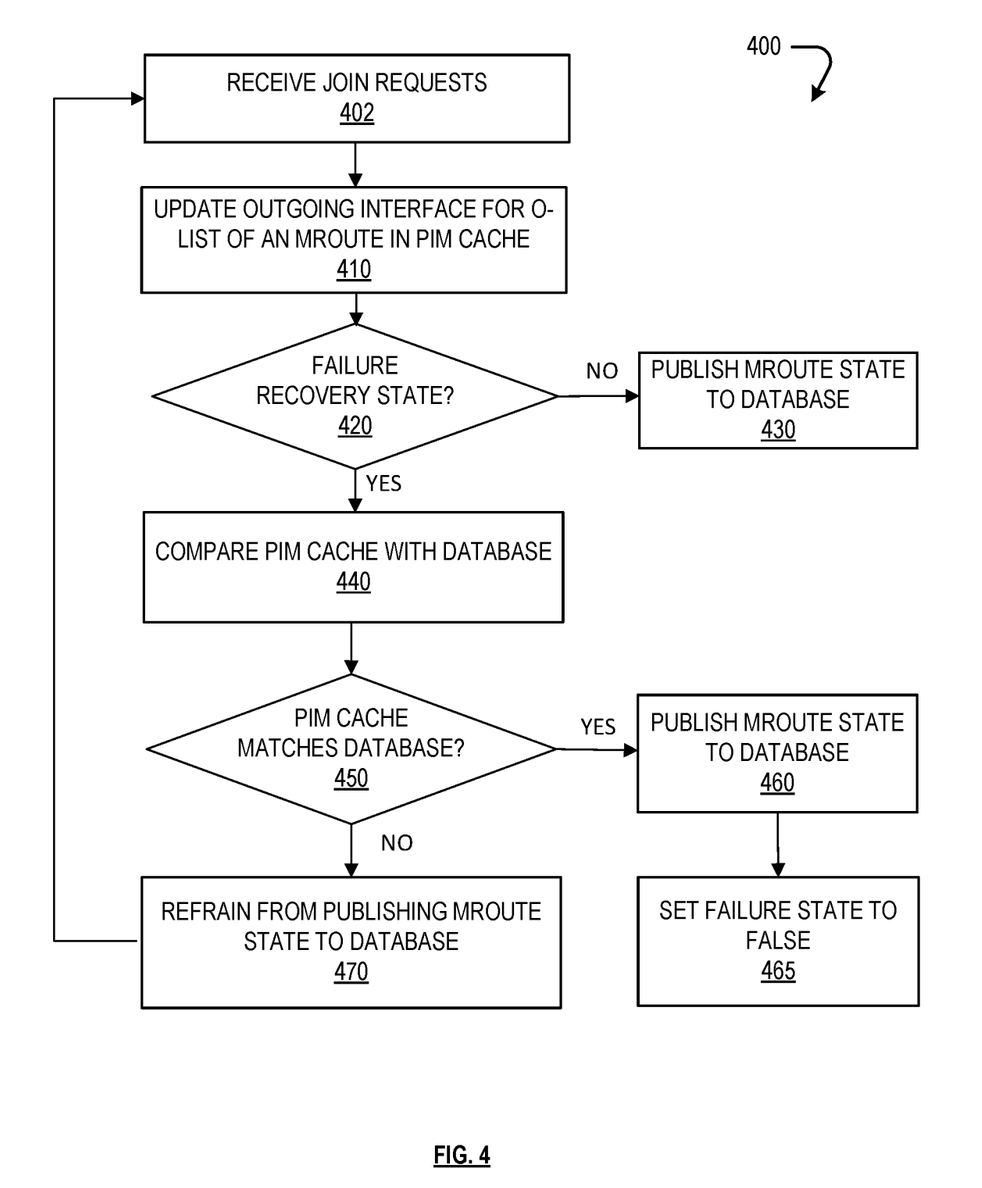
FIG. 4 is a flow diagram illustrating a method for rebuilding multicast states in accordance with examples set forth herein.

FIG. 4 is a flow diagram illustrating a method 400 for rebuilding multicast states in accordance with examples set forth herein. Method 400 may be performed by any suitable processor or other hardware discussed herein, for example, a processor or hardware included or instantiating the rebuilding engine 104, 204, or 304. The method 400 may further be performed by a combination of processors in the PIM modules 103, 303 and the rebuilding engine 104, 204, 304. In particular, in some examples, the rebuilding engine 104, 204, 304 or components thereof are instantiated by one or more processors executing machine readable instructions that comprise, at least in part, instructions corresponding to the operations of method 400. For discussion purposes, as an example, method 400 is described as being performed by the processing resource 202.

Method 400 starts in step 402, in which the processing resource 202 may receive Join requests. Join requests are transmitted from neighbor devices when the neighbor devices want to receive a multicast stream and/or when the neighbors are resending previously sent join requests in response to noticing that the other device has recovered from a failure.

In step 410, the processing resource 202 updates an outgoing interface for the Olist of a given mroute in the PIM cache. The updating is based on one of the received Join request from neighbor devices, with the given mroute that is to be updated being determined based on information specified in the request. The updating of the Olist may include the addition of an outgoing interface to the Olist. For example, if a device connected to interface $O_3$ subscribes to a multicast stream corresponding to mroute $M_2$, then the Olist of the mroute $M_2$ may be updated to add the interface $O_3$.

In step 420, the processing resource 202 determines if the networking device 200 (or a particular mroute) is in a failure recovery state. As explained above, failure may occur in a variety of ways, including for example, a PIM module failure, a management module failure, a VSF commander failure, an ISSU failure or other failure. As set forth above, the networking device 200 changes its genID when a failure occurs. A recovery process follows the failure and the PIM cache may be erased during the failure or during the recovery process. Once the failure occurs and prior to completion of recovery, the network device 200 is in a failure recovery state. In some examples, the failure recovery state may be set upon discovery of a failure on an mroute-by-mroute basis, in which case step 420 may comprise determining whether the particular mroute that was updated in block 410 is in a failure recovery state. In other examples, a failure recovery state may apply globally to all mroutes.

If in step 420, the processing resource 202 determines that the networking device 200 (or the particular mroute) is not in a failure recovery state, then the processing resource publishes the mroute state of the given mroute that was updated in step 410, including the entire Olist thereof, from the PIM cache to the centralized database in step 430. Accordingly, step 430 reflects a standard operating procedure for publishing the mroute state of an updated mroute to the centralized database in the absence of a failure.

However, if in step 420, if the network device 200 is in a failure recovery state, then the processing resource 202 compares one or more Olists in the PIM cache with one or more corresponding Olists in the centralized database in step 440. In some examples, the processing resource 202 compares a single PIM cache Olist corresponding to the given mroute that was updated in block 410 to the corresponding Olist for the same Mroute in the centralized database. However, in other examples, multiple Olists for multiple mroutes in the PIM cache may be compared to the Olists for the corresponding mroutes in the centralized database. In particular, in some examples, the processing resource 202 compares the entire PIM cache (e.g., all Olists therein) to the entire centralized database (e.g., all Olists therein). Thus, the processing resource 202 can perform the comparison on a per-mroute bases or on an entire-cache basis.

In step 450, a determination is made as to whether the PIM cache matches the centralized database, either for a single mroute or for multiple mroutes. If the PIM cache matches the centralized database in step 450, the processing resource 202 publishes the mroute state from the PIM cache to the centralized database in step 460 and subsequently sets the failure state to false in step 465. Once the failure state is set to false in step 465, the processing resource 202 will no longer detect a failure state upon receiving Join requests and will publish the mroute state to the centralized database without making a comparison between the PIM cache Olist and the centralized database Olist. The publication of the mroute state from the PIM cache to the database comprises either (a) writing the contents of the Olist of the given mroute into the corresponding mroute in the database, overwriting any data previously stored in the Olist in the database, or (b) writing the contents of all of the Olists in the PIM cache into the corresponding mroutes in the database, overwriting the data previously written there.

However, if in step 450, the PIM cache Olist of the given mroute (or all of the PIM cache Olists, in some examples) does not match the corresponding Olist(s) in the centralized database, the processing resource 202 will refrain from publishing the mroute state in the PIM cache to the centralized database in step 470. When the Olists do not match, the recovery is deemed incomplete and the PIM cache Olist reflects an intermediate state. Publication of the intermediate state to the centralized database would create a traffic disruption for one or more end users. Thus, refraining from publishing the mroute state from the PIM cache to the centralized database in this situation prevents traffic disruption to end users.

After refraining from publishing the mroute state to the centralized database in step 470, the processing resource 202 may continue to receive Join requests and the process repeats until the PIM cache Olists of all of the mroutes match the centralized database Olists. Upon finding this match, the processing resource 202 publishes the mroute state from the PIM cache to the centralized database and sets the failure state to false.

Figure 5:
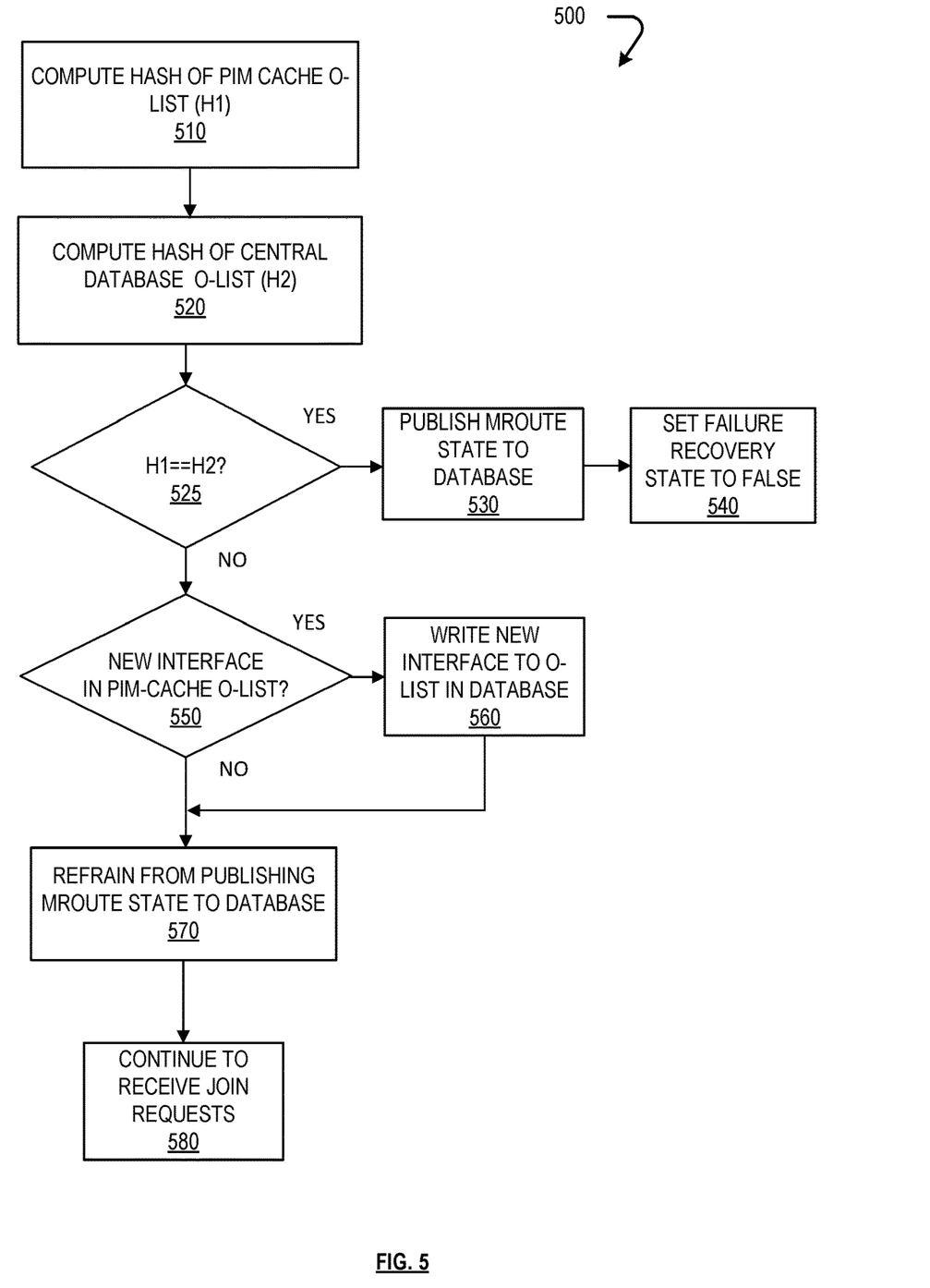
FIG. 5 is a flow diagram illustrating further details of a method performed by the networking device for rebuilding multicast routes in accordance with examples set forth herein.

FIG. 5 is a flow diagram illustrating a method 500 for rebuilding multicast states in accordance with examples set forth herein. Method 500 may be performed by any suitable processor discussed herein, for example, a processor included the rebuilding engine 104, 204, or 304. The method 500 may further be performed by a combination of processors in the PIM modules 103, 303 and the rebuilding engine 104, 204, 304. In particular, in some examples, the rebuilding engine 104, 204, 304 or components thereof are instantiated by one or more processors executing machine readable instructions that comprise, at least in part, instructions corresponding to the operations of method 500. For discussion purposes, as an example, method 400 is described as being performed by the processing resource 202.

The method 500 provides a more specific example of portions of the method 400, as well as other operations. Specifically, the method 500 may be performed after block 420 of the method 400 when the failure state is true. If the failure state is false, the method 500 is not performed. The method 500 further illustrates a particular technique for making the comparison of the PIM cache to the centralized database (e.g., a particular example of the operations of step 440 of the method 400). Finally, the method 500 illustrates a specific situation of a new interface being present in the PIM cache and the handling of the new interface.

In step 510, in order to perform the comparison described above with respect to step 440 of the method 400, the processing resource 202 computes a hash of one or more of the PIM cache Olists, which is designated herein and in FIG. 5 as, for example, H1. In step 520, the processing resource 202 computes a hash of one or more of the centralized database Olists, which is designated herein as, for example, H2. In both cases, the processing resource 202 may compute H1 and H2 based on an Olist for one mroute (i.e., the given mroute that has been updated in block 410) in some examples or based on multiple Olists for multiple mroutes in other in examples (e.g., in examples which the Olists of the entire PIM cache are compared with all of the Olists in the database). In some examples in which multiple Olists are to be hashed, multiple hashes are computed, e.g., one for each Olist. In other examples in which multiple Olists are to be hashed, a single hash is calculated for all of the multiple Olists (e.g., by concatenating the Olists together and computing a hash of the result).

In step 525, the processing resource 202 determines if the hash(es) computed for the PIM cache Olist(s) is(are) the same as the hash(es) computed for the centralized database Olist(s), i.e., whether H1 is equal to H2. If H1 is equal to H2, the processing resource 202 publishes the mroute state of the given mroute of the PIM cache to the centralized database in step 530. Further, the processing resource resets the failure recovery state or status to false in step 540.

The resetting of the failure recovery state to false in step 540 may be performed, in some examples, on an mroute-by-mroute basis, such as in examples in which the comparison of step 525 is performed for just the given mroute, rather than for the entire PIM cache. In these examples, the failure recovery state is set to false only for the given mroute that was updated in block 410. Thereafter, when additional PIM messages are received for that given mroute, they may thereafter be handled using normal processing (because the flag for that mroute is set to false) without needing to repeat the method 500 for that message. However, other messages received for other mroutes whose flag is still set to true may still need to be processed using the method 500.

In other examples, the resetting of the failure recovery state to false in step 540 may be performed globally for all mroutes, such as in examples in which the comparison of step 525 is performed for the entire PIM cache. After setting the flag to false for the entire PIM cache, normal processing may resume for all subsequent PIM messages without needing to repeat the method 500 for any of the messages, until and unless another failure occurs.

Alternatively, if H1 is not equal to H2 in step 525, the processing resource 202 determines or detects if the PIM cache Olist includes a new interface in step 550. A new interface means an outgoing interface that is present in the Olist of a given mroute in the PIM cache but is not yet present in the Olist of the corresponding mroute in the database. Such a new interface may result, for example, from the receipt of a truly new Join request, as opposed to a re-sent joint request. The existence of the new interface indicates that the change to the PIM cache Olist reflects not a rebuilding request but rather a new subscription, and thus it may be desired to program this new interface into the database without delay to allow for traffic to being flowing to the new subscriber. Thus, If the PIM cache Olist does contain a new interface in step 550, the processing resource 202 writes the new outgoing interface to the Olist of the corresponding mroute in the centralized database in step 560. Adding this new outgoing interface to the database is different from publishing the entire mroute state. Publishing the entire mroute state requires publishing the entire Olist of the given mroute that was updated (or all of the Olists of all mroutes, in some examples) from the PIM cache to the centralized database and overwriting the corresponding Olist (or all of the Olists in some examples) in the centralized database.

Whether or not the PIM cache Olist contains a new interface in step 550, the processing resource 202 refrains from publishing the mroute state to the centralized database in step 570 as such publication would overwrite the centralized database with an incomplete mroute state. In step 580, the processing resource 202 continues to receive Join requests from neighbor networking devices.

The methods, systems, devices, and equipment described herein may be implemented with, contain, or be executed by one or more computer systems. The methods described above may also be stored on a non-transitory computer-readable medium. Many of the elements may be, comprise, or include computers systems.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A networking component comprising:
   switching hardware;
   a centralized database that is used to program the switching hardware; and
   a protocol independent multicast (PIM) module comprising processing circuitry programmed to create and maintain a PIM cache and to, upon experiencing a failure in a network using a PIM protocol:
   compare an outgoing list (Olist) for a multicast route (mroute) in the PIM cache to an Olist in the centralized database;
   determine whether the Olist in the PIM cache matches the Olist in the centralized database;
   publish an mroute state of the mroute from the PIM cache to the centralized database on a condition that the Olist in the PIM cache matches the Olist in the centralized database; and
   refrain from publishing the mroute state of the mroute from the PIM cache to the centralized database on a condition that the Olist in the PIM cache does not match the Olist in the centralized database.

2. The networking component of claim 1, wherein the processing circuitry receives a PIM message related to the mroute from a neighboring network component.

3. The networking component of claim 2, wherein the processing circuitry is configured to updates the Olist in the PIM cache in response to receiving the PIM message.

4. The networking component of claim 1, wherein the processing circuitry is configured to, in response to determining that the Olist in the PIM cache does not match the Olist in the centralized database, and detects whether a new interface is present in the Olist in the PIM cache.

5. The networking component of claim 4, wherein the processing circuitry is configured to, in response to detecting a new interface is present in the Olist in the PIM cache, adds the new interface to Olist in the centralized database.

6. The networking component of claim 5, wherein adding the new interface to the Olist in the centralized database occurs without publishing the mroute state from the PIM cache to the centralized database.

7. The networking component of claim 6, wherein the processing circuitry further receives at least one further update to the Olist for the mroute and storing the further update in the PIM cache Olist.

8. The networking component of claim 1, wherein the processing circuitry is configured to compute a hash of the Olist in the PIM cache and compute a hash of the Olist in the centralized database.

9. The networking component of claim 8, wherein the processing circuitry is configured to compare the Olist in the PIM cache to the Olist in the centralized database by comparing the hash of the Olist in the PIM cache with the hash of the Olist in the centralized database.

10. The networking component of claim 9, wherein the processing circuitry is configured to publish the mroute state from the PIM cache to the centralized database when the hash of the Olist in the PIM cache is equal to the hash of the Olist in the centralized database.

11. The networking component of claim 1, wherein the processing circuitry is configured to reset a failure recovery status to false upon publishing the mroute state to the centralized database.

12. A method comprising:
    experiencing a failure in a network using a protocol independent multicast (PIM) protocol during a state of recovering from the failure, using at least one processor to:
    receive a PIM message related to a given multicast route (mroute) at a network component;
    update, based on the received PIM message, an outgoing list (Olist) for the given mroute in the PIM cache (PIM cache Olist) stored in a PIM cache of the network component;
    determine whether the PIM cache Olist matches a centralized database Olist located in a centralized database; and
    publish an mroute state from the PIM cache to the centralized database only on condition of the PIM cache Olist matching the centralized database Olist.

13. The method of claim 12, comprising, during the state of recovering from the failure, using the at least one processor to determine that the PIM cache Olist does not match the centralized database Olist and refraining from publishing the mroute state in the PIM cache to the centralized database.

14. The method of claim 13, comprising, during the state of recovering from the failure using the at least one processor to detect a new interface in the PIM cache Olist.

15. The method of claim 14, comprising using the at least one processor to add the new interface from the PIM cache Olist to the centralized database Olist.

16. The method of claim 12, comprising using the at least one processor to compute a hash of the PIM cache Olist, compute a hash of the centralized database Olist, and compare the hash of the PIM cache Olist with the hash of the centralized database Olist in order to determine if the PIM cache Olist matches the centralized database Olist.

17. The method of claim 16, comprising, during the state of recovering from the failure, using the at least one processor to publish the mroute state from the PIM cache to the centralized database when the hash of the PIM cache is equal to the hash of the centralized database.

18. A non-transitory computer-readable medium storing instructions executable by a processor to cause the processor to:
   detect that a failure has occurred at a network component and cause the network component to enter a failure recovery state, the network component using a protocol independent multicast (PIM) protocol;
   during the failure recovery state:
      receive updates to an outgoing list (Olist) for a given multicast route (mroute) at the network component;
      update a PIM cache Olist in the network component with the received updates;
      determine whether the PIM cache Olist matches a centralized database Olist located in a centralized database; and
      publish an mroute state from the PIM cache to the centralized database only on condition of the PIM cache Olist matching a centralized database Olist.

19. The non-transitory computer-readable medium of claim 18, wherein the instructions cause the processor to, in response to determining that the PIM cache Olist does not match the centralized database Olist, refrain from publishing the mroute state in the PIM cache to the centralized database.

20. The non-transitory computer-readable medium of claim 19, wherein the instructions cause the processor to, in response to detecting a new interface in the PIM cache Olist, add the new interface from the PIM cache Olist to the centralized database Olist without publishing the mroute state in the PIM cache to the centralized database.

* * * * *